Oct. 17, 1944.   E. F. CHANDLER   2,360,399
DIRECTIONAL GYROSCOPE AND FOLLOW-UP
Filed Oct. 20, 1941   3 Sheets-Sheet 2
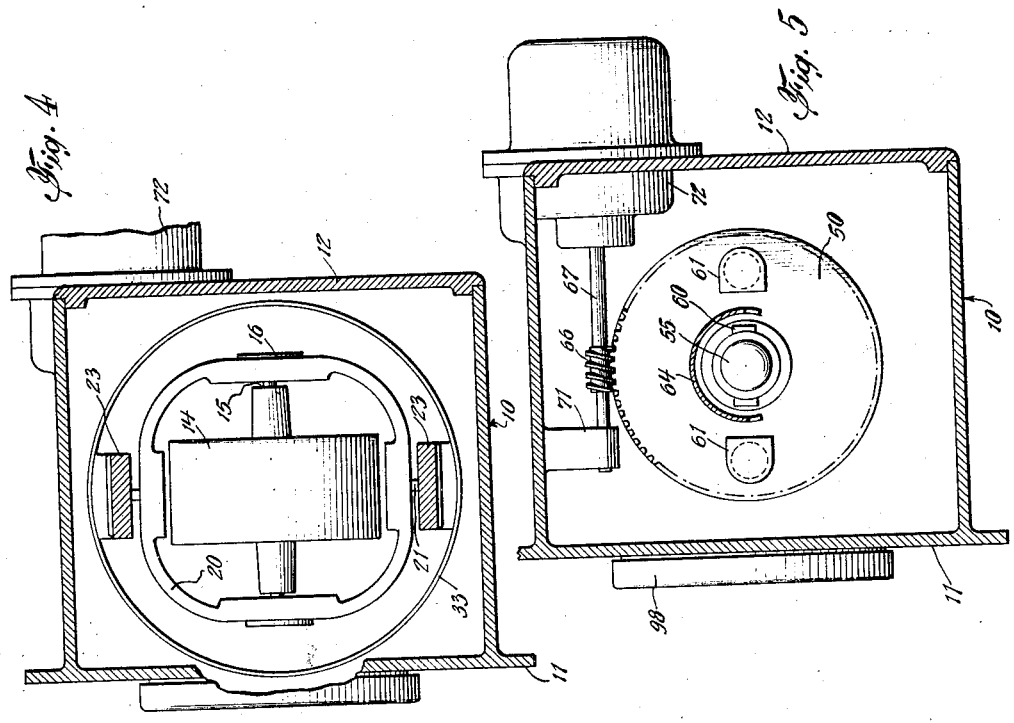
INVENTOR.
EDWARD F. CHANDLER
BY
His Attorney Oct. 17, 1944.  E. F. CHANDLER  2,360,399
DIRECTIONAL GYROSCOPE AND FOLLOW-UP
Filed Oct. 20, 1941  3 Sheets-Sheet 3
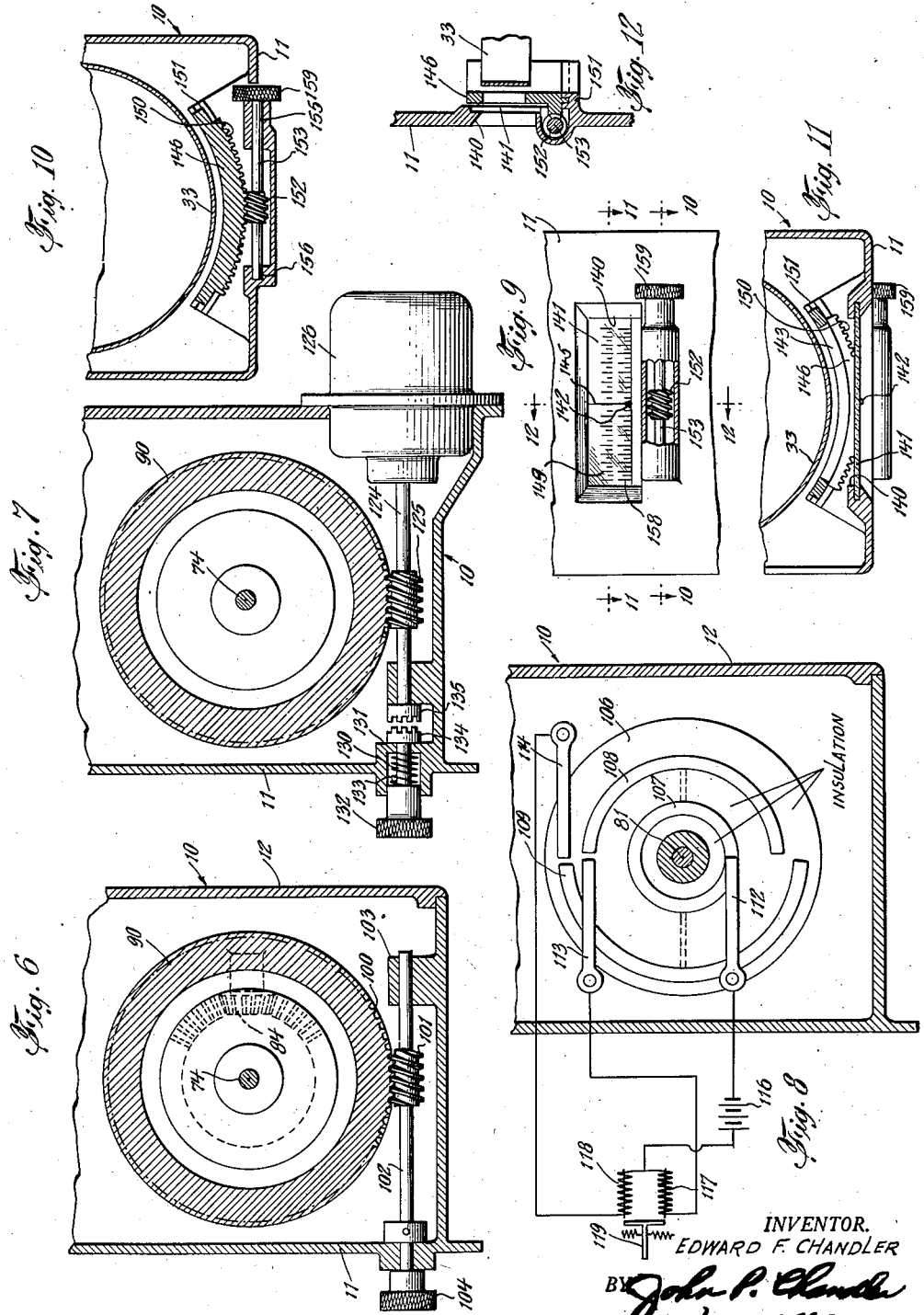
INVENTOR.
EDWARD F. CHANDLER Patented Oct. 17, 1944

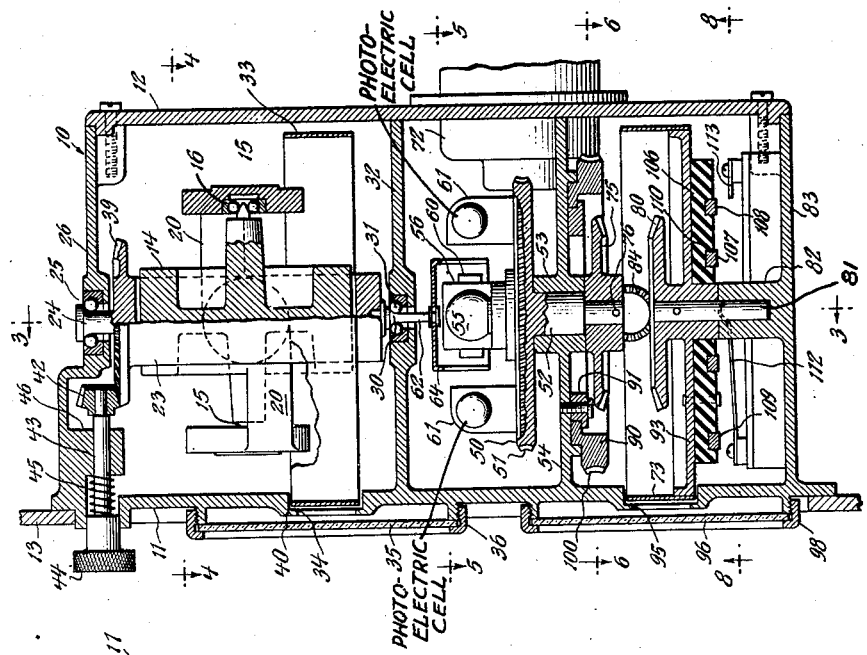
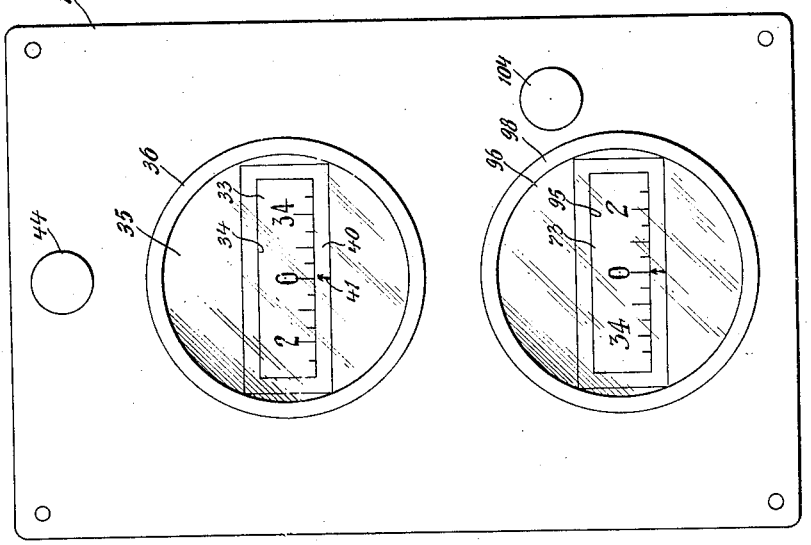
INVENTOR.
EDWARD F. CHANDLER

2,360,399

UNITED STATES PATENT OFFICE 2,360,399

DIRECTIONAL GYROSCOPE AND FOLLOW-UP

Edward F. Chandler, Brooklyn, N. Y.

Application October 20, 1941, Serial No. 415,838

8 Claims. (Cl. 33—204)

This invention relates to improvements in gyroscopes. More particularly it pertains to improvements in gyroscopically controlled, course indicating and/or steering devices. An object of the invention is to provide an improved device of the order described having a gyroscope mounted to permit freedom of the spinning gyro wheel about horizontal and vertical axes, and in which this freedom is not restrained by the means employed for translating the movements of the device relative to the gyroscope into course indicating and/or steering action.

It is also an object to provide an improved device of this character in which the course indicating and/or steering action may be adjusted relative to the gyroscope, means being provided for effecting such adjustment during operation of the gyroscope.

In the embodiment shown, the gyro element carries means which, in cooperation with means carried by a phantom element, serve, without imposing any torque upon the gyro element, to cause said phantom element to follow the apparent angular movements of the gyro. The means shown comprise a wave-responsive couple between the gyro and the phantom element. By placing the actuating elements of this couple upon the phantom element or ring, the extremely light means for cooperation therewith may be carried by the gyro element. For example, the phantom element or ring may carry a source of radiant energy such as a lamp, and means responsive thereto such as a photocell, and the cooperating means carried by the gyro may be a suitable lightweight shield adapted to govern the influence of said lamp upon said cell in response to angular motion of the phantom element relative to the gyro.

The phantom element or ring is preferably caused to rotate in one direction or the other by suitable motor means in response to said influence and to thereby retain its position relative to the gyro. In this manner any work that the gyro might otherwise have been called upon to perform is assumed by the power driven follower or phantom element. In the embodiment shown, the gyro element carries a compass card or other means for indicating the relative gyro position. A second card or indicating means is associated with the phantom element. Between this second card and the phantom element, means, such as the differential gear mechanism, are employed to permit of this card being adjusted relative to that carried by the gyro element. By this means, and without disturbing the operation of the device as a directional gyro, a dirigible device on which the instrument is carried may be automatically steered over a pre-determined course. The course may be manually altered at will by an operator on the dirigible device, or said course may be governed by remote control employing radio or other suitable means. In an alternative construction, the manual adjusting means may be replaced by remote control-motor driven means to permit of varying the course of a dirigible device unmanned by human hands.

When the instrument is used for steering a torpedo or other fully automatic device or craft, it may be set to steer a straight course between two points, or the direction may be varied during its travel. In this instance, automatic means may be brought into play at predetermined points in the course to change the relative position of the control element with respect to the phantom element, thereby causing the device to assume a new direction under the control of the gyro. On the other hand, radiant energy or wave-responsive means may be carried by the vessel dispatching the torpedo, the same being so associated with the instrument that at the will of the operator, remote from the torpedo, he may send out signals which will alter the relation between the control element and the phantom element for the purpose of changing or correcting the course. Also, with an instrument of this character the torpedo dispatched under gyro control for a target may, as it approaches the same, pick up radiant or other wave energy therefrom to correct the gyro course and insure a hit. The topedo may also send out energy to be reflected by the target, the same acting to correct the original gyro-controlled course to insure accuracy of fire control.

The device of the present invention may also be useful on aircraft, not only as a means for dispatching bombers and other types of planes over a given course, but also as a means for steering control for passenger planes, because of the response of the device to corrective influences, such as radio beacons, to aid in maintaining safe directional flying during periods of low visibility.

Another important object of the present invention is the provision of a novel movable reference line for the compass card for correcting the gyro reading to agree with the compass reading. A further object of the invention is to provide in combination with a gyroscope improved means for preventing errors due to precession.

Other objects and features as well as the advantages of the invention will be apparent upon reading the specification in conjunction with the drawings.

In the drawings:

Fig. 1 is a front elevation of one embodiment of the present invention.

Fig. 2 is a central vertical section taken on line 2—2 of Fig. 1.

Fig. 3 is a central vertical section taken on line 3—3 of Fig. 2.

Figs. 4, 5 and 6, respectively, are horizontal sections taken on lines 4—4, 5—5 and 6—6, respectively, of Fig. 2.

Fig. 7 is a horizontal section taken through an alternative form of the present invention.

Fig. 8 is a horizontal section taken on line 8—8 of Fig. 2.

Fig. 9 is a broken front elevation of a portion of the device, partially in section, and showing a modified form of structure.

Fig. 10 is a broken horizontal section taken on line 10—10 of Fig. 9.

Fig. 11 is a broken section taken on line 11—11 of Fig. 9.

Fig. 12 is a broken vertical section taken on line 12—12 of Fig. 9.

The first embodiment of the present invention illustrated in Figs. 1 to 6, inclusive, and Fig. 8 includes a housing 10 provided with a flanged front wall or face plate 11 and a removable back cover 12. The housing may be secured to an instrument panel 13 by any suitable means. The gyro element comprises a rotor 14 formed with shaft portions 15 which are journalled at their opposite terminals as by ball-bearing means 16, or otherwise, in the horizontal or inner gimbal ring 20. Horizontal gimbal ring 20 is provided with pivot portions 21 which are mounted at their opposite ends in suitable bearing members 22 in the outer or vertical gimbal ring 23. Outer gimbal ring 23 is formed with a pivot 24 at its upper end which is suitably journalled at 25 in the upper wall 26 of the housing by ball-bearing means or otherwise. Shaft portion 30 at the lower end of vertical gimbal 23 is journalled, as at 31, in an intermediate horizontal frame portion 32.

Vertical gimbal 23 carries a compass card 33, and such card may be viewed through a sight opening 34 in the front wall 11 of the housing. A disc 35 of glass or other transparent material may be associated with the sight opening and may be mounted in a supporting ring or bezel 36 removably secured on the front face of wall 11. This transparent closure prevents dust from passing into the housing. In the embodiment shown, opening 34 is outwardly flanged, as at 40, and a reference line or index mark 41 is inscribed at the center of one horizontal edge of such flanged portion. This reference line may be inscribed directly upon the glass, if desired.

For the purpose of setting the gyro element in meridian prior to starting the rotor, outer gimbal 23 may be provided at its upper end with a bevelled gear 39 which is normally out of engagement with a bevelled pinion 42 carried on a shaft 43 journalled in the upper wall 26 of the housing. At its outer end, shaft 43 is provided with a manually rotatable handle 44, and the shaft is urged outwardly by means of a spring 45. The outer face of gear 42 is thus normally in engagement with wall 46 of the journal support for shaft 43, and thus the bevelled pinion 42 is out of engagement with bevelled gear 39. When, however, it is desired to set the outer gimbal at any desired position, the shaft 43 is moved inwardly against the compression of spring 45 to the position it occupies in Fig. 2, after which shaft 43 may be manually rotated to bring the gyro element and the compass card 33 to any given position relative to reference line 41.

Apparent movements in azimuth of the gyro are converted into actual and similar movements in a phantom element or ring, journalled in vertical alignment with the vertical gimbal 23, without imposing any torque or friction whatsoever upon the delicate gyro mechanism, by the following means. The phantom element may include a circular disc 50 provided with worm gear teeth 51 around its periphery, and with a downwardly extending, shaft portion 52 journalled within a bearing member 53 carried by a second intermediate, horizontal frame portion 54 suitably secured to, or carried by, the housing. At the center of the phantom element 50 a suitable source of radiant energy, such as a light 55, is mounted and is adapted to rotate with the phantom element. The light may, if desired, be enclosed within a housing 56 having light-focusing or directing members 60 on opposite sides thereof. Also, on diametrically opposed sides of the upper surface of the phantom element, photo-cells or other light-sensitive elements 61 are secured in such a position as to receive light through the focusing members 60, unless such light is shielded by the following means.

On a lower extension 62 of shaft 30 supporting vertical gimbal ring 23, a light shield 64 is mounted. Shields 64 should be light in weight and may be of any conventional form or shape, such as that of an inverted U, and is of such dimensions as to be capable of cutting off the light from both photo cells 61 when it occupies the position shown in Fig. 5. It will thus be seen that when the arms of the inverted U shaped member are in line with the two photo cells, no light will reach either one. These arms are further formed so that when the U member turns axially, one of the cells is immediately energized while the other is maintained in darkness, although this arrangement may, of course, be reversed.

To cause the phantom element to move in response to the activity of the photo cells, worm 66 carried on drive shaft 67 engages the teeth of worm gear 51 around the external periphery of the phantom element 50. Shaft 67, to which worm 66 is keyed or otherwise secured, is journalled at 71, and the shaft is rotated in one direction or the other by means of a reversible motor 72 suitably supported relative to the housing. The photo cells 61 and the motor 72 are included in a suitable circuit (not shown), and such motor may thus be caused to drive the phantom element in one direction or the other, thereby maintaining synchronism between it and the gyro in accordance with activity of the photo cells.

Since the gyro will maintain a substantially north and south position, it will be obvious that the compass card 33 carried by the gyro provides the usual directional gyro. A second course-indicating card 73 is caused to move in accordance with movement of the phantom element, and the following means are provided to afford an adjustment between the course-indicating card 73 and the phantom element, which, as aforesaid, moves in accordance with movement of the gyro and of compass card 33. Shaft 52 is formed with a reduced portion 74 at its lower end, such portion carrying a bevelled gear 75 which is secured thereto by means of a pin 76 or otherwise. Immediately below bevelled gear 75 is a second bevelled gear 80 of similar size and shape carried on a shaft 81 journalled at its lower end in a bearing portion 82 carried on the lower wall 83 of the housing.

Rotation of bevelled gear 75 is imparted to bevelled gear 80 by means of an intermediate or idler pinion 84 which is journalled at 85 in a downwardly projecting portion 86 carried on a rotatable disc 90. This disc is journalled for rotative movement by means of a flanged ring 91 secured to the lower surface of horizontal wall 54, the flanged ring engaging an inward, annular flange 92 carried by, or formed integrally with, rotatable disc 90. It will thus be seen that so long as disc 90 is stationary, any rotation of bevelled gear 75 imparts similar rotation in the opposite direction to bevelled gear 80. Shaft 81 also carries a follower element or ring 93 forming a support for course-indicating card 73, which support may, if desired, be formed integrally with bevelled gear 80.

Course-indicating card 73 may be viewed through an opening 95 in front wall 11 of the housing, such opening likewise having a transparent cover 96 supported in a bezel 98. It will be seen from the description thus far that phantom element 50 follows the apparent movement of the gyro element, and any rotation of the phantom element is immediately imparted to follower 93 and course-indicating card 73. By interposing the single idler 84 between bevelled gears 75 and 80, rotation of the former imparts opposite rotation to the latter. By providing two idlers instead of one, however, gear 80 may be caused to rotate in the same direction as gear 75, and accordingly course-indicating card 73 and compass card 33 will likewise rotate in the same direction. This change may also be effected by other well known mechanical expedients.

Steering-control means, hereinafter described, are associated with the follower element or ring 93. The following means, however, are provided for affording an adjustment between follower element 93 and course-indicating card 73, and the phantom element, to permit the setting of the gyro for a desired course, or for re-setting the same to compensate for errors due to gyroscopic precession. In order to permit manual rotation of disc 90, the outer periphery of such disc is formed with worm gear teeth 100, such teeth being engaged by a worm 101 carried on a shaft 102 which is journalled at its inner end at 103 and at its outer end in front wall 11 of the housing. A thumb turn 104 or any other suitable means may be employed for rotating shaft 102 and worm 101.

The means under control of the gyro for governing the steering apparatus of the dirigible device may obviously be associated directly with the phantom element 50. It is preferred, however, to provide a control element which, like card 73, is also adapted to be moved in azimuth with the phantom element, but which is independently adjustable relative thereto by the means just described. This permits of causing the dirigible device to be automatically steered over any desired course without disturbing the function of the device as a course indicator or compass.

One form of device for controlling movement of the rudder is shown particularly in Figs. 2 and 8 as being associated with follower element 93. This includes a disc 106 of suitable insulating material rigidly secured to such element. A plurality of contact members 107, 108 and 109 are carried by this rotatable disc, preferably in recesses 110. Member 107 is circular and is continuously engaged by fixed contact member 112 carried by the housing. Members 108 and 109 are semicircular, are the arcs of different circles, and are oppositely facing, the former being engaged by fixed contact member 113, and the latter by fixed contact member 114. Contact members 107, 108 and 109 are interconnected, and the circuit further includes a source of electrical energy 116 and a pair of independently operable elements 117 and 118 which may be solenoids, motors, or otherwise, which are associated with the rudder-actuating means 119. The element 119 may also constitute one of several rudder indicators.

When the ship is on its course, the several movable contact members are, with reference to the fixed contact members, in the position shown in Fig. 11. When the ship gets off its course, however, follower 93 carrying disc 106 rotates in one direction or the other, thus closing one of the branches of the circuit and operating the rudder-control mechanism. This control element just described is illustrative only, and may, of course, be of any other construction well known in the art as a means for shifting the helm to the right or to the left to correct the yawing of the vessel, or other device, and bring it back upon its course.

The construction illustrated provides only one rudder positioned to the right and to the left, although it may be modified to cause the helm to move through an arc proportional to the deviation of the ship, or it may move it hard over. For example, the control element normally may hold the rudder in a mid-position, and the movement of the element to the right or to the left of a given point, due to the yawing of the vessel, may cause the rudder to move full over to the left or to the right to head the vessel back onto its course. In this instance, the rudder would remain full over until the vessel crossed the course, whereupon it would move full in the opposite direction. To avoid this, any suitable means may be employed whereby the degree of movement of the rudder is governed by the degree of movement of the control element.

The structure for effecting adjustment between the phantom element 50 and the follower element 93, comprising manually rotatable disc 90 carrying idler 84, the disc being rotated by manual rotation of worm shaft 102 and worm 101, is useful in all ships having human operators for secondary control. In the event that an embodiment of the present invention is used on devices having only remote control, such as torpedoes, the structure shown in Fig. 7 may be substituted for that shown in Fig. 6. In this instance, shaft 124 carrying worm 125 is driven by a reversible motor 126 carried by the housing, such motor being controlled by radio waves, or otherwise. Rotation of shaft 124 and worm 125 imparts rotation to circular disc 90, which, again, changes the relationship between the phantom element and the follower element.

Prior to the dirigible device carrying the apparatus of the present invention being started on its course, disc 90 is manually set to provide a given adjustment between the two elements, and this is accomplished by means of a shaft 130 journalled at 131 in front wall 11 of the housing, such shaft carrying any manual rotating means 132 at its forward end, and being urged outwardly by means of the spring 133. At its inner end, shaft 130 carries one portion 134 of a toothed clutch, the complemental portion 135 being carried by shaft 124. The two clutch portions are thus normally out of engagement, as shown at Fig. 7. When shaft 130 is moved inwardly, the teeth and complemental clutch portions become engaged and permit manual rotation of shaft 124 and worm 125.

In the preferred embodiment of the invention, reference line or index 41 is placed either on the marginal edge 40 of opening 34, or on the glass 35, and accordingly always has a fixed position. In the event, however, that the compass card 33 moves relative to reference line 41 due to gyroscopic precession, it may be desirable to move the reference line to a point wherein the desired graduation on the compass card is aligned with the reference line.

The means for shifting the reference line, to correct the gyro reading to agree with a magnetic compass reading, are shown in Figs. 9 to 12, inclusive. In this modified embodiment, the front wall 11 of the housing is formed with a sight opening 140 having a transparent closure or window 141, which preferably has a reference line 142 in the center thereof which is fixed relative to the gyro housing. An arcuate, transparent slide member 143 has on its face a reference line 145 which normally registers with fixed reference line 142, as shown in Fig. 9. The arcuate, transparent slide is further provided with suitable graduations 149 on each side thereof, such graduations corresponding to the graduations 158 carried on the compass card 33. Arcuate slide member 143 is mounted in a carriage 146 formed with a rack portion 150 on its outer periphery, such carriage being journalled in a bearing 151 for arcuate movement. The carriage is manually moved by means of a worm 152 carried on a shaft 153 journalled at its terminals in front wall 11, as shown at 155 and 156. One end of this shaft is provided with a suitable thumb turn or knob 159, which can be manually rotated from the front of the housing. Such rotation causes compass corrections to be set off to the right or left of fixed line 142, and gyro graduations are now read relative to this setting.

In the several embodiments of the gyroscope constituting the present invention the rotor may, of course, be revolved by any suitable means, such as an electric motor, or otherwise. Inasmuch as the art relative to the spinning of the gyro element has been well developed, no specific prime mover is shown herein. It will also be appreciated that many changes and modifications may be made in the foregoing embodiments without departing from the spirit of the invention as defined by the appended claims.

What I claim is:

1. A device for controllably actuating a rudder or the like on a dirigible craft comprising a frame carried by the craft, a directional gyro, a phantom element, a prime mover for rotating said element in either direction in accordance with movement of the gyro, means for controlling the prime mover comprising a source of light, a light-sensitive cell carried by the element, and a light shield carried by the gyro for controlling the light source, a follower element and means comprising a gear train for causing the follower element to rotate in accordance with rotation of the phantom element, means for rotating the follower element independently of the phantom element to effect an adjustment of relative positions therebetween, a compass card carried by the gyro, a course-indicating card carried by the follower element, and steering-control means operable in accordance with movements of the follower element.

2. In an azimuth indicating free or directional gyroscope having an outer and an inner gimbal, a pivoted support for the outer ring and a rotor pivoted in the inner ring on a horizontal axis, the combination of a phantom element comprising a rotatable member, a supporting shaft therefor journalled in axial alignment with the pivoted support for the outer ring, a source of light disposed substantially in alignment with said common axis and a plurality of opposed light cells spaced from the light source, a light shield carried by the outer ring adapted to control the light from the light source, a reversible motor for rotating the phantom element in accordance with rotation of the outer ring, and a circuit including the light cells and the motor.

3. In an azimuth indicating free or directional gyroscope having a frame, an outer and an inner gimbal ring, a pivoted support for the outer ring and a rotor pivoted in the inner ring on a horizontal axis, the combination of a phantom element comprising a rotatable member, a supporting shaft therefor journalled in axial alignment with said pivoted support, a source of light carried by said member substantially in alignment with said common axis, and a plurality of opposed light cells spaced from the light source carried by the member, a light shield carried by the outer ring adapted to control the light from the light source, a reversible motor for rotating the phantom element in accordance with rotation of the outer ring, and a plurality of circuits, each including the motor and one of the light cells, a follower rotatable by the phantom element, and means for adjusting the position of the follower relative to the phantom element.

4. A directional gyroscope comprising a frame, an azimuth direction keeping gyroscope including a rotor and inner and outer gimbal rings, a phantom element rotatable in accordance with movement of the gyroscope, a follower element, the outer gimbal ring, the phantom element and the follower element being journalled on a common axis, means interconnecting siad elements to impart rotation to the follower element upon rotation of the phantom element, a compass card carried by the gyroscope, a course indicating card carried by the follower element, a fixed reference line and a movable reference line for the compass card, the movable reference line comprising a substantially transparent member provided with graduations thereon positioned relative to the fixed reference line, and means for moving the member relative to the fixed line.

5. A directional gyroscopic device comprising a frame, an azimuth direction-keeping gyroscope, a phantom element and a follower element, all independently journalled within the frame in axial alignment, means for causing rotation of the phantom element in accordance with movement of the gyroscope comprising a light source disposed relative to said common axis, photo-electric cells on opposite sides of the phantom element, a light shield carried by the gyroscope for controlling the light from said light source, a reversible motor for rotating the phantom element in accordance with rotation of the gyroscope, a circuit including said light cells and the reversible motor, a gear train connecting the phantom element with the follower element for imparting rotation to the follower element upon rotation of the phantom element, and means for effecting an adjustment of the follower element relative to the phantom element comprising a rotatable ring, a pinion included in said gear train supported by said rotatable ring, and means for rotating said ring.

6. An apparatus for steering a dirigible device comprising a casing, a gimbal-mounted gyro rotatable about its vertical axis carried by the casing, a compass card carried by the gyro, a phantom ring journalled in the casing and adapted to follow the rotation of the gyro about its vertical axis, a motor for driving the phantom ring in response to movements of the gyro, a follower ring journalled in the casing and adapted to be rotated about its vertical axis by, and in accordance with, the rotation of the phantom ring, a course-indicating card carried by the follower ring, means for positioning the course-indicating card and follower ring relative to the phantom ring, and means moving with the phantom ring and responsive to radiant energy controlled by the relative rotation between the phantom ring and gyro, governing the operation of said motor.

7. In an apparatus for steering a dirigible device, the combination of a casing, a gimbal-mounted gyro rotatable about its vertical axis carried in the casing, a compass card carried by the gyro, a phantom ring journalled in the casing and adapted to follow the rotation of the gyro about its vertical axis, a motor for driving the ring in response to movements of the gyro, a follower ring journalled in the casing and adapted to be rotated about its vertical axis in accordance with movements of the phantom ring, means controlled by the follower ring governing the steering of the device, means for angularly adjusting the follower ring about its vertical axis relative to the angular position of the phantom ring, and means responsive to radiant energy controlled by relative azimuthal movement between the gyro and phantom element, governing the operation of said motor.

8. An apparatus for stabilizing a dirigible device comprising a casing, a gyroscope mounted in gimbal rings suspended for rotation about its vertical axis within the casing, a phantom element journalled in the casing and adapted to follow the rotation of the gyroscope about its vertical axis, a motor for driving said element in response to said movements of the gyroscope, a source of light within the casing, means carried by the gyroscope controlling the emission of light from said source, a light-responsive cell governed by said emission of light controlling said motor, whereby the phantom element is caused to follow the movements of said gyroscope, means carrying a course-indicating card journalled in the casing and adapted to indicate the position in azimuth held by the gyroscope, a gear-train transmitting motion from the phantom element to the means carrying the course-indicating card, and means including said gear-train whereby the positioning of the course-indicating card may be adjudged relative to the position held by the gyroscope.

EDWARD F. CHANDLER.